US006628777B1

(12) United States Patent
McIllwaine et al.

(10) Patent No.: US 6,628,777 B1
(45) Date of Patent: *Sep. 30, 2003

(54) METHOD AND SYSTEM FOR SCHEDULED DELIVERY OF TRAINING TO CALL CENTER AGENTS

(75) Inventors: John C. C. McIllwaine, Alpharetta, GA (US); Matthew G. A. McConnell, Duluth, GA (US)

(73) Assignee: Knowlagent, Inc., Alpharetta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/442,207

(22) Filed: Nov. 16, 1999

(51) Int. Cl.[7] .............................................. H04M 3/00
(52) U.S. Cl. .............................. 379/265.01; 379/265.06
(58) Field of Search ...................... 379/265.01–265.14, 379/266.01–266.1, 267, 309

(56) References Cited

U.S. PATENT DOCUMENTS

| | | | |
|---|---|---|---|
| 3,594,919 A | 7/1971 | De Bell et al. | 434/319 |
| 3,705,271 A | 12/1972 | De Bell et al. | 360/74.4 |
| 4,684,349 A | 8/1987 | Ferguson et al. | 434/308 |
| 4,776,016 A | 10/1988 | Hansen | 704/275 |
| 4,853,952 A | 8/1989 | Jachmann et al. | 379/88.11 |
| 5,058,008 A | 10/1991 | Schumacher | 705/9 |
| 4,916,726 A | 6/1992 | Morley et al. | 379/88.13 |
| 5,199,062 A | 3/1993 | Von Meister et al. | 379/88.04 |
| 5,309,505 A | 5/1994 | Szlam et al. | 379/88.01 |
| 5,310,349 A | 5/1994 | Daniels et al. | 434/350 |
| 5,311,422 A | 5/1994 | Loftin et al. | 703/2 |
| 5,384,841 A | 1/1995 | Adams et al. | 379/266.04 |
| 5,416,694 A | 5/1995 | Parrish et al. | 705/8 |
| 5,469,491 A | 11/1995 | Morley et al. | 379/88.13 |
| 5,511,112 A | 4/1996 | Szlam | 379/266.06 |
| 5,533,115 A | 7/1996 | Hollenbach et al. | 379/221.11 |

(List continued on next page.)

OTHER PUBLICATIONS

Curilem et al.; *Considerations for the Design of a Tutoring System Applied to Diabetes;* Proceedings of the 22nd Annual EMBX International Conference; Jul. 23–28, 2000; pp. 2811–2814.

Cybulski et al.; *Teaching Systems Analysis and Design Using Multimedia and Patterns;* IEEE; 2000; pp. 113–122.

Granić et al.; *User Interface Aspects of an Intelligent Tutoring System;* 22nd Int. Conf. Information Technology Interfaces ITI 2000, Jun. 13–16, 2000; pp. 157–164.

Primary Examiner—Ahmad F. Matar
Assistant Examiner—Quynh Nguyen
(74) Attorney, Agent, or Firm—King & Spalding LLP

(57) ABSTRACT

Scheduling and delivering training or other information to agents in a call center or other constituent contact system. Agent schedule data from a workforce management component or agent workload data from a work distribution component is analyzed to determine whether an agent is scheduled for training or is available for training, respectively. The agent's terminal user interface is monitored to determine whether the agent is interacting with constituents. If the agent is not busy, training materials or other information are delivered over a communications network to the agent's terminal. To avoid interference between a training session and customer call activities, the agent may be disconnected from the system's customer contact engine before delivery of the training materials is complete. If call volume to the call center exceeds a predetermined threshold during agent training, the training session is discontinued so that the agent may resume serving customers.

44 Claims, 5 Drawing Sheets

U.S. PATENT DOCUMENTS

| | | |
|---|---|---|
| 5,535,256 A | 7/1996 | Maloney et al. ............ 379/309 |
| 5,583,965 A | 12/1996 | Douma et al. .............. 704/275 |
| 5,594,791 A | 1/1997 | Szlam et al. ........... 379/265.09 |
| 5,597,312 A | 1/1997 | Bloom et al. ............... 434/362 |
| 5,633,924 A | 5/1997 | Kaish et al. ........... 379/266.03 |
| 5,675,637 A | 10/1997 | Szlam et al. ........... 379/142.17 |
| 5,696,811 A | 12/1997 | Maloney et al. ........ 379/265.07 |
| 5,703,943 A | 12/1997 | Otto ...................... 379/265.11 |
| 5,721,770 A | 2/1998 | Kohler .................. 379/265.12 |
| 5,727,950 A | 3/1998 | Cook et al. ................. 434/350 |
| 5,738,527 A | 4/1998 | Lundberg ................... 434/322 |
| 5,745,109 A | 4/1998 | Nakano et al. ............. 345/838 |
| 5,757,644 A | 5/1998 | Jorgensen et al. .......... 700/183 |
| 5,790,798 A | 8/1998 | Beckett, II et al. ......... 709/224 |
| 5,818,907 A | 10/1998 | Maloney et al. ......... 379/32.01 |
| 5,825,869 A | 10/1998 | Brooks et al. ......... 379/265.12 |
| 5,827,071 A | 10/1998 | Sorensen et al. ........... 434/323 |
| 5,833,468 A | 11/1998 | Guy et al. .................. 434/350 |
| 5,861,881 A | 1/1999 | Freeman et al. ......... 707/500.1 |
| 5,877,954 A | 3/1999 | Klimasauskas et al. ....... 700/29 |
| 5,903,641 A | 5/1999 | Tonisson ............... 379/265.12 |
| 5,937,037 A | 8/1999 | Kamel et al. ............ 379/88.19 |
| 5,943,416 A | 8/1999 | Gisby .................... 379/265.13 |
| 5,946,387 A | 8/1999 | Miloslavsky ........... 379/265.12 |
| 5,963,635 A | 10/1999 | Szlam et al. ................. 379/309 |
| 5,971,271 A | 10/1999 | Wynn et al. ................. 235/380 |
| 6,014,134 A | 1/2000 | Bell et al. .................... 345/705 |
| 6,038,544 A | 3/2000 | Machin et al. ................. 705/11 |
| 6,044,355 A | 3/2000 | Crockett et al. ............... 705/8 |
| 6,044,368 A | 3/2000 | Powers .......................... 707/2 |
| 6,052,460 A | 4/2000 | Fisher et al. ........... 379/265.12 |
| 6,058,163 A | 5/2000 | Pattison et al. ........ 379/265.06 |
| 6,118,865 A | 9/2000 | Gisby .................... 379/265.02 |
| 6,119,097 A | 9/2000 | Ibarra .......................... 705/11 |
| 6,128,380 A | 10/2000 | Shaffer et al. ......... 379/265.01 |
| 6,144,971 A | 11/2000 | Sunderman et al. ........ 707/500 |
| 6,170,014 B1 | 1/2001 | Darago et al. .............. 709/229 |
| 6,171,109 B1 | 1/2001 | Ohsuga ..................... 434/118 |
| 6,215,865 B1 | 4/2001 | McCalmont ........... 379/212.01 |
| 6,263,049 B1 | 7/2001 | Kuhn ...................... 379/32.01 |
| 6,275,812 B1 | 8/2001 | Haq et al. ..................... 705/11 |
| 6,278,978 B1 | 8/2001 | Andre et al. .................... 705/9 |

METHOD AND SYSTEM FOR SCHEDULED DELIVERY OF TRAINING TO CALL CENTER AGENTS

FIELD OF THE INVENTION

The present invention relates generally to call centers for managing customer communications and, more specifically, to non-disruptive delivery of content, such as training, to call center customer service agents.

BACKGROUND OF THE INVENTION

A call center is a system that enables a staff of call center agents to service telephone calls to or from the customers or other constituents of an organization. Typically, calls are distributed and connected to agents that are available at the time of the call or are otherwise most suited to handle the call. The call-distribution function, commonly referred to as automatic call distribution ("ACD"), is generally implemented in software that executes in a switching system, such as a private branch exchange, that connects customer calls to agent telephones. A workforce management ("WFM") component is often employed by a call center to schedule and manage agent staffing and call center capacity.

More recently, computer-telephony integration ("CTI") has been widely employed in call centers. In a typical call center, a CTI component conveys telephony information, such as the telephone number of the calling party and the identity of the agent to whom the call is connected, from the ACD switching system to other components of the call center system. The other components of the call center system typically use this information to send relevant database information, such as the account file of the calling party, across a local area network ("LAN") or other communications network to a data terminal of the agent to whom the call is connected. The CTI component, other system components, and the LAN can also be used to deliver other information to the agents.

More generally, the business function provided by a call center may be extended to other communications media and to contact with constituents of an organization other than customers. For example, an e-mail help desk may be employed by an organization to provide if technical support to its employees. Web-based "chat"-type systems may be employed to provide information to sales prospects. When a broadband communications infrastructure is more widely deployed, systems for the delivery of broadband information, such as video information, to a broad range of constituents through constituent contact centers will likely be employed by many organizations.

Agents in call centers and other constituent contact centers must be well-trained in order to maximize their productivity and effectiveness. Agent training must be intensive and frequent in centers that handle complex interactions with constituents or that change call scripts or other interaction programs often. In many situations, the quality and effectiveness of agent training may significantly drive the performance of the call center.

In conventional call centers, training is provided to call center agents through a variety of mechanisms. The supervisor of the call center may simply walk over to individual agents, or place telephone calls to the individual agents, and pass on new information to the agents personally. New information may be distributed by email, by an instructor in a classroom setting, or over an intranet. Alternatively, the information may be broadcast over a public announcement system or may be displayed on a large wall display at the front of the call center. New information may also be provided through a "chair drop" by which written information updates or training materials are handed to the agents for their consumption.

More recently, automated methods for agent training and information updating have been developed. Computer-based training ("CBT") involves the distribution of training programs to an agent's computer desktop. CBT may be distributed in a broadcast mode, with each agent receiving the same training at the same time. CBT may more effectively be deployed by allowing individual agents to access desktop training on their own schedule and at their own pace through self-directed CBT. In self-directed CBT, each agent takes the initiative to enter a training session, and the pace and content of the training can reflect individual agent learning rates and base knowledge.

While computer-based training methods provide a significant improvement in training effectiveness, efficiency, and sophistication to call centers and other constituent contact centers, conventional CBT-based training regimens have significant drawbacks. Broadcast CBT systems require that a group of agents be diverted en masse from their customer interaction duties for a period of time, and those systems do not accommodate large variations in learning rate or base knowledge among agents. While self-directed CBT enables agents to learn at their own pace and to enter training sessions when they wish, conventional self-directed training is not amenable to centralized management and control by the call center. For example, conventional self-directed CBT cannot be scheduled to avoid disrupting ongoing agent/customer interactions and is not integrated with call center ACD or workforce management systems. As a result, call centers employing conventional CBT techniques are often forced to make an unsatisfactory tradeoff between short-term call center performance and longer-term agent knowledge and effectiveness.

SUMMARY OF THE INVENTION

The present invention supports the scheduling and delivery of training or other information to an agent in a call center or other constituent contact environment. Agent schedule data from a workforce management component or agent workload data from a work distribution component (such as an ACD) may be analyzed to decide whether an agent is scheduled for training or available for training.

According to one aspect of the invention, the user interface at the agent's system terminal may be monitored to determine whether the agent is interacting with constituents. If the agent is not busy, training materials or other information are delivered to the agent's desktop through the system's communications network.

To avoid interference between a training session and the agent's customer call duties, the agent may be disconnected from the system's customer contact engine before delivery of the training materials, according to another aspect of the invention. If call volume (or another metric) to the call center exceeds a predetermined threshold during the training session, the session may be discontinued so that the agent may return to his or her customer call duties.

The invention can include software components for analyzing an organization's communications with its customers or other constituents. A scheduling component accepts agent work assignment data, analyzes the data to determine when the agent is scheduled to receive training or other information, and schedules the delivery of training material or other information to the agent. A monitoring component can monitor the agent's communications with customers to determine if the agent is available for training. A delivery component can deliver training materials or other information to the agent over a communications network when the agent is scheduled and/or available to receive the information.

The present invention thus advantageously integrates workforce management and work distribution components of a call center to schedule and deliver training materials or other information to the agent without disrupting the agent's customer contact duties or otherwise reducing the performance of the call center.

DETAILED DESCRIPTION OF THE EXEMPLARY EMBODIMENTS

Turning now to the drawings, in which like numerals indicate like elements throughout the several figures, an exemplary embodiment of the invention will now be described in detail. The present invention is directed to the scheduled delivery of content, such as training, to a constituent contact agent, such as a call center agent. Although the preferred embodiment of the invention will be described with respect to the delivery of training materials to an agent in a call center, those skilled in the art will recognize that the invention may be utilized in connection with the scheduled delivery of a variety of information in other operating environments.

Figure 1:
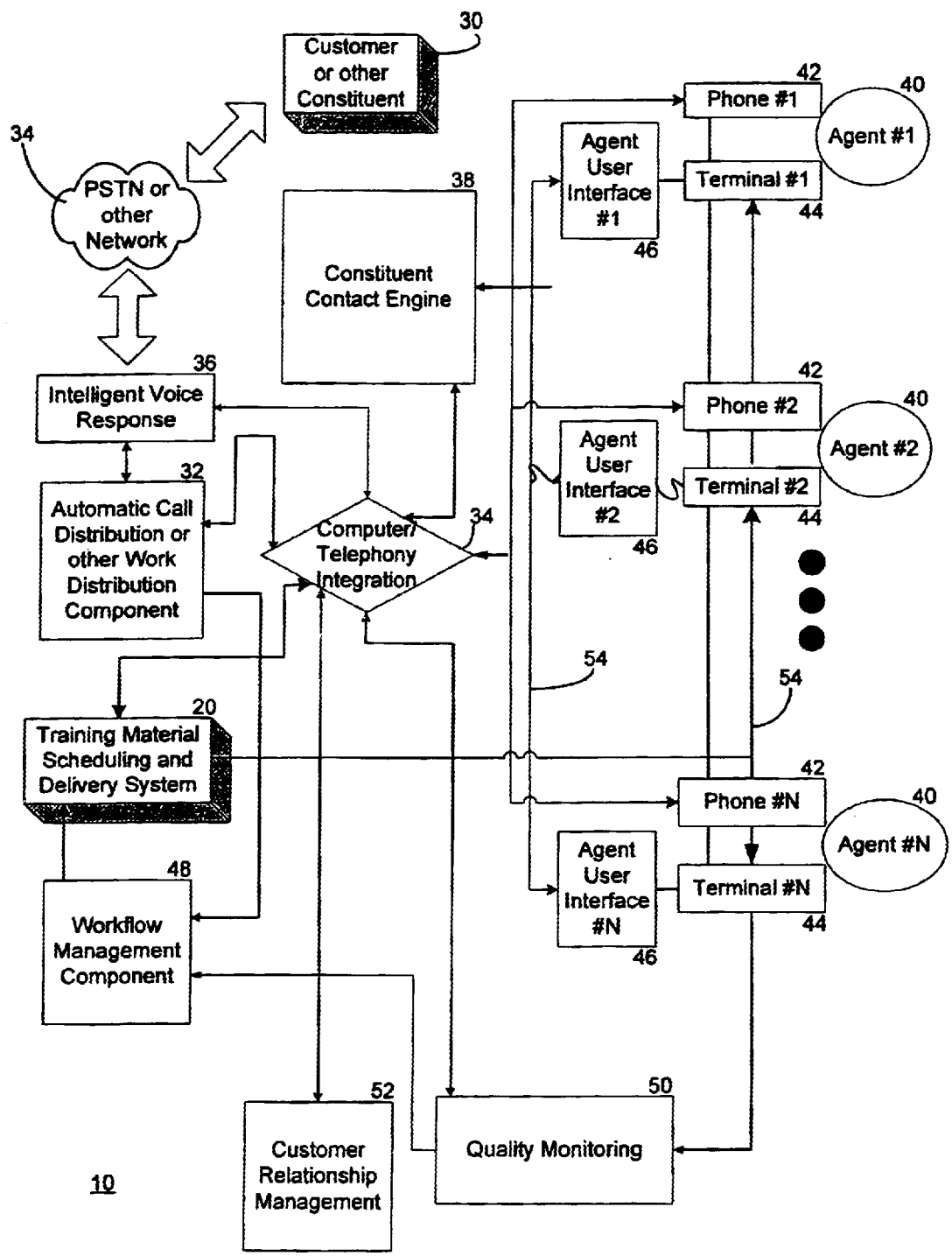
FIG. 1 is a block diagram illustrating a system for managing a computer-based customer call center system in accordance with an exemplary embodiment of the present invention.

FIG. 1 illustrates a computer system for managing a call center in which one advantageous embodiment of the present invention is implemented. A call center 10 includes a training system 20 operative to schedule and deliver training material to call center agents 40. In a typical application of the call center 10, a customer 30 calls via the public switched telephone network ("PSTN") or other network to the call center 10. The customer call may be initiated in order to sign up for long distance service, inquire about a credit card bill, or purchase a catalog item, for example. Through the PSTN 34, the call from the customer 30 reaches an Automatic Call Distribution ("ACD") component 32 of the call center. The ACD component functions to distribute calls from customers to each of a number of call center agents 40 who have been assigned to answer customer calls, take orders from customers, or perform other duties. Agents are typically equipped with a phone 42 and a call center computer terminal 44 for accessing product information, customer information, or other information through a database. For example, in a call center implemented to support a clothing catalog, the terminal 44 for an agent could display information regarding a specific item of clothing when a customer 30 expresses an interest in purchasing that item.

Customer phone calls and relevant database information are integrally managed by modem call centers 10 through what is known as computer/telephone integration ("CTI"). A CTI component 34 enables the call center 10 to extract information from the phone call itself and to integrate that information with database information. For example, the calling phone number of a customer 30 may be used in order to extract information regarding that customer stored in the call center database and to deliver that customer information to an agent 40 for the agent's use in interacting with the customer. CTI 34 may also interact with Intelligent Voice Response ("IVR") unit 36, for example to provide a touch-tone menu of options to a caller for directing the call to an appropriate agent.

Depending on the nature and function of the call center, a constituent contact engine 38 is a software-based engine within the call center 10 that manages the interaction between customers and agents. For example, the constituent contact engine 38 may sequence the agent 40 through a series of information screens in response to the agent's information input during a customer call. The agent advantageously provides input to the constituent contact engine 38 through an agent user interface 46, which is typically a graphical user interface presented at a computer terminal 44.

A typical call center 10 includes a Workforce Management ("WFM") component 48. WFM component 48 is used to manage the staffing of agents 40 in the call center 10 so that call center productivity can be optimized. For example, the volume of calls into or out of a call center 10 may vary significantly during the day, during the week, or during the month. WFM component 48 preferably receives historical call volume data from ACD component 32. The WFM component 48 can determine an appropriate level of staffing of agents 40 so that call hold times are minimized, on the one hand, and so that agent overstaffing is avoided, on the other hand.

In a typical call center, customer calls and interactions between customers and agents 40 are selectively sampled as part of a quality control program within the call center 10. This function is typically performed through a Quality Monitoring component 50 that monitors voice interaction through the agent's phone 42 and monitors information delivered through the system to the agent's terminal 44. In addition, Customer Relationship Management ("CRM") systems 52 are often employed in call centers for a variety of marketing or customer service functions. For example, a CRM system 52 may be used to suggest to a caller ordering a certain book that the caller may wish to purchase other related books or other books that have been ordered by purchasers of the same book.

The call center 10 includes a communications network 54 to interconnect and link the aforementioned components. For a call center in which all elements. are located at the same site, for instance, a local area network may provide the backbone for the call center communications network 54. In call centers for which the elements are geographically dispersed, the communications network may comprise a wide area network, a virtual private network, a satellite communications network, or other communications network elements as are known in the art.

The training system 20 according to one advantageous embodiment of the present invention is implemented in software and is installed in or associated with the call center computer system 10. By integration with the WFM component 48 and/or the CTI 34 of the call center, the training system 20 can deliver training material to agents 40 via communications network 54 in scheduled batches. Integration with the WFM component 48 and the CTI 34 enables the training system 20 to deliver training materials to agents at times when those agents are available and when training will not adversely impact call center performance. The training system 20 is also preferably in communication with quality monitoring component 50 through the communications network 54 so that training materials may be delivered to those agents who are most in need of training. Proficient agents are thus spared the distraction of unneeded training, and training can be concentrated on those agents most in need. Advantageously, call center management may set pass/fail criteria within the quality monitoring component 50 to trigger the scheduling of appropriate training to appropriate agents. This functionality may be provided via a rules engine implemented as part of the training system 20 or within the contact engine of the call center. By integrating with the CTI 34, the training system 20 can deliver training materials based on CTI-derived data such as customer call volume, independent of or complemented by the training schedule derived from the workforce management component 48 or the work distribution component 32.

In another advantageous embodiment of the present invention, the training system 20 may be deployed on a stand-alone server located remotely from call center 10. For example, training system could be deployed to serve a number of independent call centers 10, such as in a "web services" business model. In such a remote deployment, the problems of integration with individual call center computer systems can be avoided and the training system 20 can be maintained at a single central location.

A wide range of agent training scenarios can be supported by the training system 20. The training materials that are appropriate for a particular call center application can vary according to the call center function. The subject matter of training materials may also vary widely; for example, training materials may be focused on product information, phone etiquette, problem resolution, or other subjects.

Figure 2:
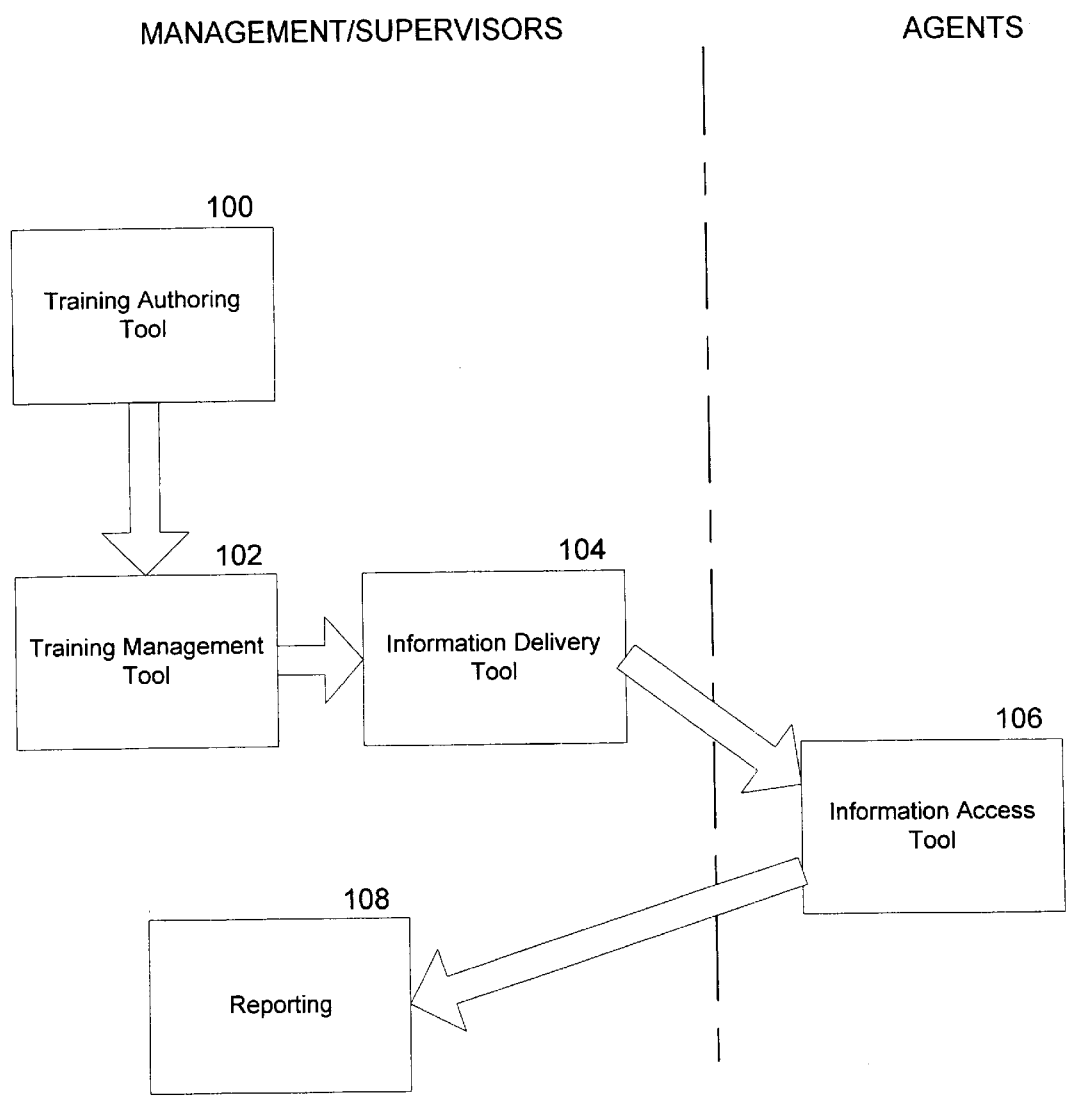
FIG. 2 is a block diagram illustrating a system for the scheduling and delivery of training materials in accordance with an exemplary embodiment of the present invention.

FIG. 2 is a block diagram illustrating a training system 20 for the scheduling and delivery of training materials to call center agents 40 in a call center 10. The training system includes a number of interoperable software modules. Training authoring tool 100 is a software module that enables the managers of a call center to develop training materials, training courses, training quizzes, and other information to be delivered to agents 40 in the call center. Training system 20 preferably further includes a training management tool 102 that enables call center managers to assign agents to groups for training purposes, to assign training materials to individual groups, and to assign groups of courses to supersets of training groups.

The training system 20 preferably further includes an information delivery tool 104 that determines when the training materials assigned by the training management tool 102 are to be delivered to agents. The information delivery tool 104 preferably receives agent workload data and call center load data from ACD 32 through CTI 34. The information delivery tool 104 also preferably receives agent schedule data from WFM 48. The training system further comprises information access tool 106 for delivering the training materials to agents over communications network 54 on a scheduled basis so as not to disrupt agent customer contact duties. Agent consumption of training and training quiz performance are tracked by the reporting module 108, which is preferably adapted to generate standard and custom reports to enable call center managers and supervisors to more effectively manage agent performance and training.

Figure 3A:
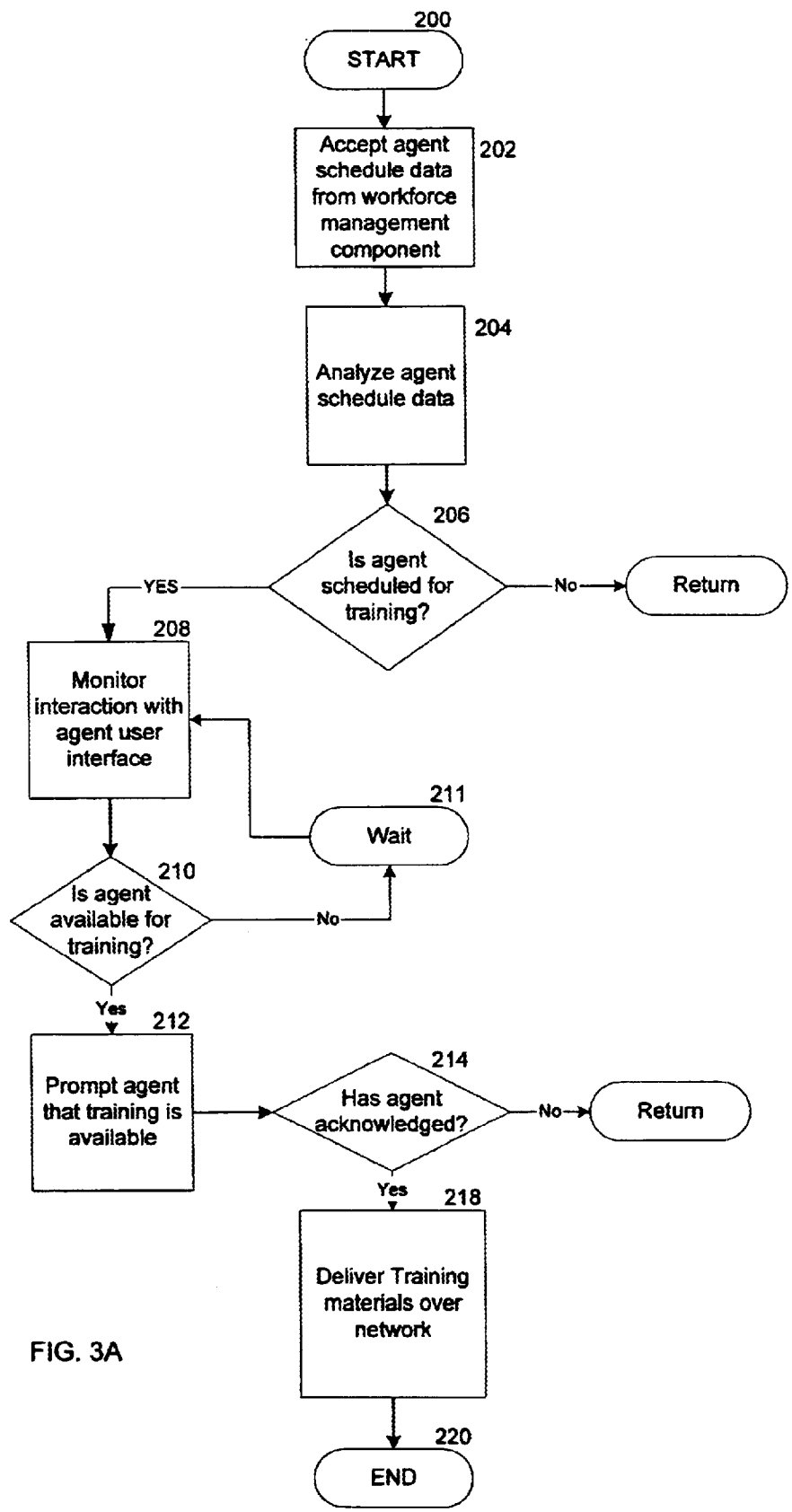
FIGS. 3A, 3B, and 3C are flow charts indicating the steps in the methods for training a contact agent to perform constituent contact duties in accordance with an exemplary embodiment of the present invention.

Turning now to FIGS. 1, 2, and 3A, the steps in a method for delivering scheduled training to a contact agent within a call center operating environment are illustrated in flow chart form. The method begins at step 200. At step 202, the information delivery tool 104 within training system 20 accepts agent schedule data from WFM component 48 of the call center computer system 10. The agent schedule data may be in many forms, but in one example the data includes agent assignments to the call center sorted by quarter-hour over a period of several days. At step 204, the training system 20 analyzes the agent schedule data provided by the WFM component 48 to determine whether the agent is scheduled for training. The method then proceeds to step 206; if the agent is not scheduled for training, the "No" branch of the flow chart is followed and the method returns. If the agent is scheduled for training, then the "Yes" branch is followed to step 208, where the agent's interaction with the agent user interface is monitored by information delivery tool 104 of the training system 20. For example, mouse movements or keyboard activity at the agent user interface can be monitored to determine whether the agent is handling a customer call. The method then proceeds to step 210, where the training system 20 determines, from the user interface activity, whether or not the agent is available for training. If the agent is not available for training, the method proceeds through the "No" branch to a wait loop at step 211 and the agent's interaction with the agent user interface is again monitored at step 208. If the agent is available for training, the method proceeds through the "Yes" branch to step 212, at which step the agent is prompted by the training system that training is available. This prompt may, for example, take the form of a pop-up screen delivered to the agent's terminal displaying a message indicating that training is now available for the agent.

The method then proceeds to step 214 at which step the training system 20 looks for an acknowledgment from the agent that the agent is ready for training. If the agent has not acknowledged by a certain predetermined time, for example, then the method proceeds through the "No" branch and returns. If the agent does acknowledge that the agent is ready for training, the method proceeds through the "Yes" branch to step 218, at which step training materials are delivered to the agent by information access tool 106 within the training system 20 over the communications network 54. Preferably, the agent has logged off of the call center computer system contact engine 38 before the training materials are delivered. In this exemplary method, the training materials delivered can, for example, comprise a sequenced series of training segments each of limited duration that together form an integrated whole. Of course, the training materials can vary considerably from call center to call center as dictated by the function of the call center and the business supported by the call center 10. The training materials delivery step 218 may be set to terminate after a predetermined amount of time. The method then terminates at step 220.

Accordingly, the method according to one exemplary embodiment as illustrated in the flow diagram of FIG. 3A accepts and analyzes agent schedule data provided from the WFM component of a call center computer system in order to non-disruptively schedule and deliver agent training.

Figure 3B:
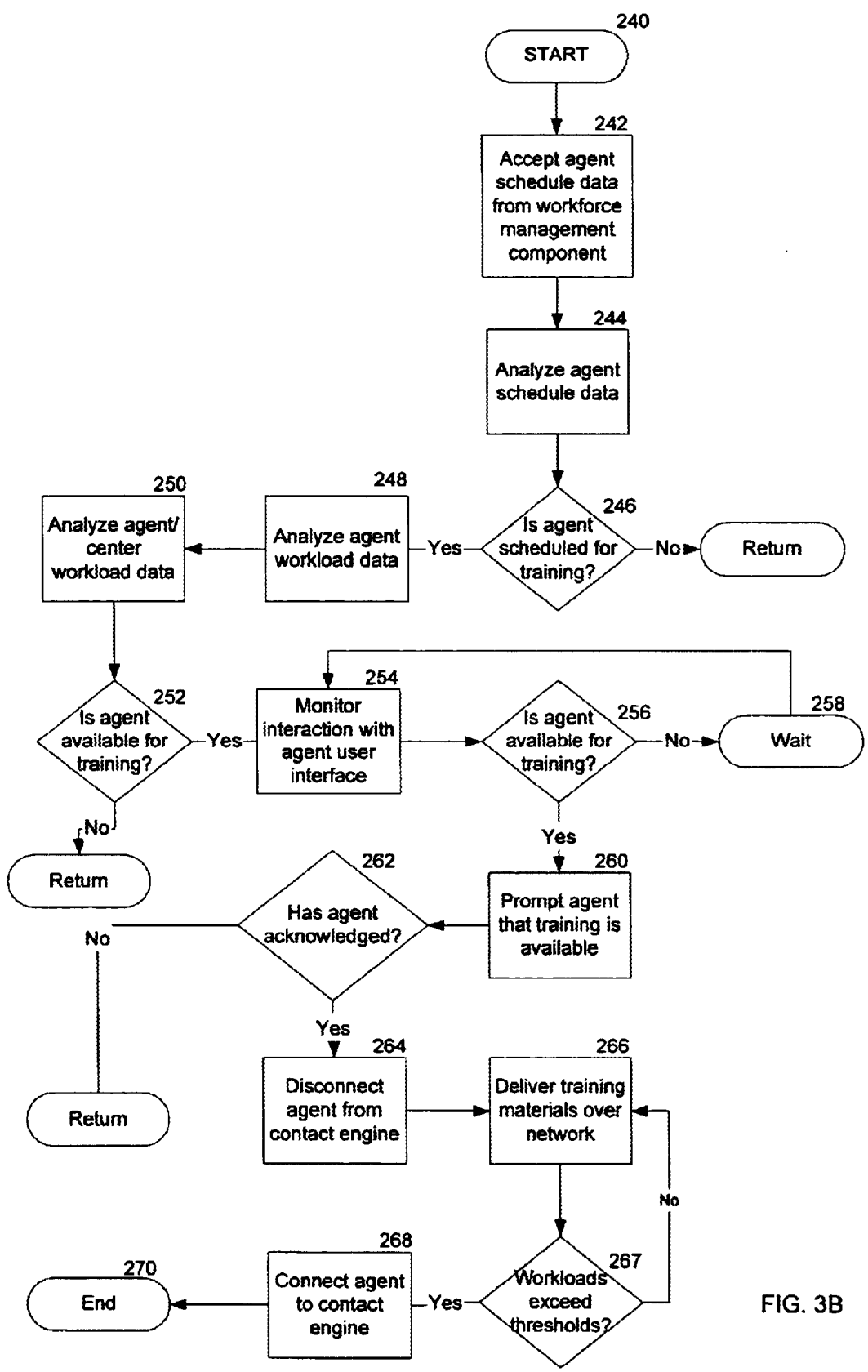

According to another advantageous embodiment, the steps in a method for managing a call center or other constituent contact system are illustrated in the flow diagram of FIG. 3B. According to this exemplary method, information from both the workforce management component 48 and the automatic call distribution component 32 are used by information delivery tool 104 within the training system 20 to non-disruptively schedule and deliver agent training. Referring now to FIGS. 1, 2, and 3B, the method begins at step 240. At step 242, the information delivery tool 104 accepts agent schedule data from a workforce management component 48 of the call center computer system 10. The method then proceeds to step 244, where the agent schedule data is analyzed by the training system, and then proceeds to step 246. If the training system 20 determines at step 246 that the agent is not scheduled for training, based on the analysis of the agent's schedule data, then the method proceeds through the "No" branch and returns. If the training system 20 determines at step 246 that the agent is scheduled for training, then the method proceeds through the "Yes" branch to step 248.

The information delivery tool 104 of the training system 20 accepts agent workload data at step 248 from the automatic call distribution component 32 or other work distribution component of the call center system. Moving to step 250, the training system 20 analyzes the agent workload data to determine whether the call center's workload metrics (such as call volume or hold time) exceed certain predetermined thresholds. If the call center or the individual agent are too busy for the agent to be available for training, the method proceeds through the "No" branch at step 252 and returns. If the analysis of the call center metrics indicates that the agent is available for training, the method proceeds through the "Yes" branch to step 254.

At step 254, the training system 20 monitors the agent's interaction with the agent user interface, such as by monitoring mouse movements or terminal keystrokes. The training system 20 thereby determines whether or not the agent is available for training at step 256. If unavailable, the method proceeds through the "No" branch to the wait loop at step 258, and the agent's interaction with the agent user interface is again monitored at step 254. If the agent is available for training, the method proceeds through the "Yes" branch to step 260.

At step 260, the agent 40 is prompted by the training system 20 that training is available. The prompt to the agent may, for example, be in the form of a pop-up screen delivered to the agent's terminal 44 informing the agent that training is available. According to the method, the training system then waits for an acknowledgment by the agent that the agent is ready for training, as shown at step 262. If the agent does not acknowledge that it is available for training, the method proceeds through the "No" branch and returns. If and when the agent acknowledges the prompt, the method proceeds through the "Yes" branch to step 264 and the agent is disconnected from the contact engine 38 within the call center computer system 10 so that interference between the training session and customer calls can be avoided. At step 266, the information access tool 106 of training system 20 delivers training materials to the agent 40 over the communications network 54.

The information delivery tool 104 monitors the work distribution component 32 at step 267 and determines whether predetermined agent or call center workload thresholds are exceeded during training material delivery. If agent or call center thresholds are not exceeded, then training material delivery continues at step 266. If thresholds are exceeded at step 267, the agent is reconnected to call center contact engine 38 at step 268 to resume customer contact duties, and the method then terminates at step 270.

The agent workload data provided by the ACD 32 or other work distribution component in the method illustrated in FIG. 3B may take many forms. For example, the agent workload data may simply indicate that the level of call center activity within the system exceeds a certain predetermined threshold, and that no training for any agent is therefore appropriate at that time. As another example, the agent workload data may include individual workload data for each of several agents, indicating which, if any, agents are available for a training session. In any event, the agent workload data is preferably real-time or near real-time data reflecting the activity within the call center.

Workload thresholds for all agents as a group or for individual agents may be set advantageously by the manager of the call center depending on the needs of the particular call center. For example, if reports from the quality monitoring component 50 indicate that the quality of call center interactions with customers has declined over the past week, the thresholds may be adjusted so that training is provided even when the call center is relatively busy. Advantageously, these thresholds may also be set automatically as a function of data supplied by the quality monitoring component 50.

Figure 3C:
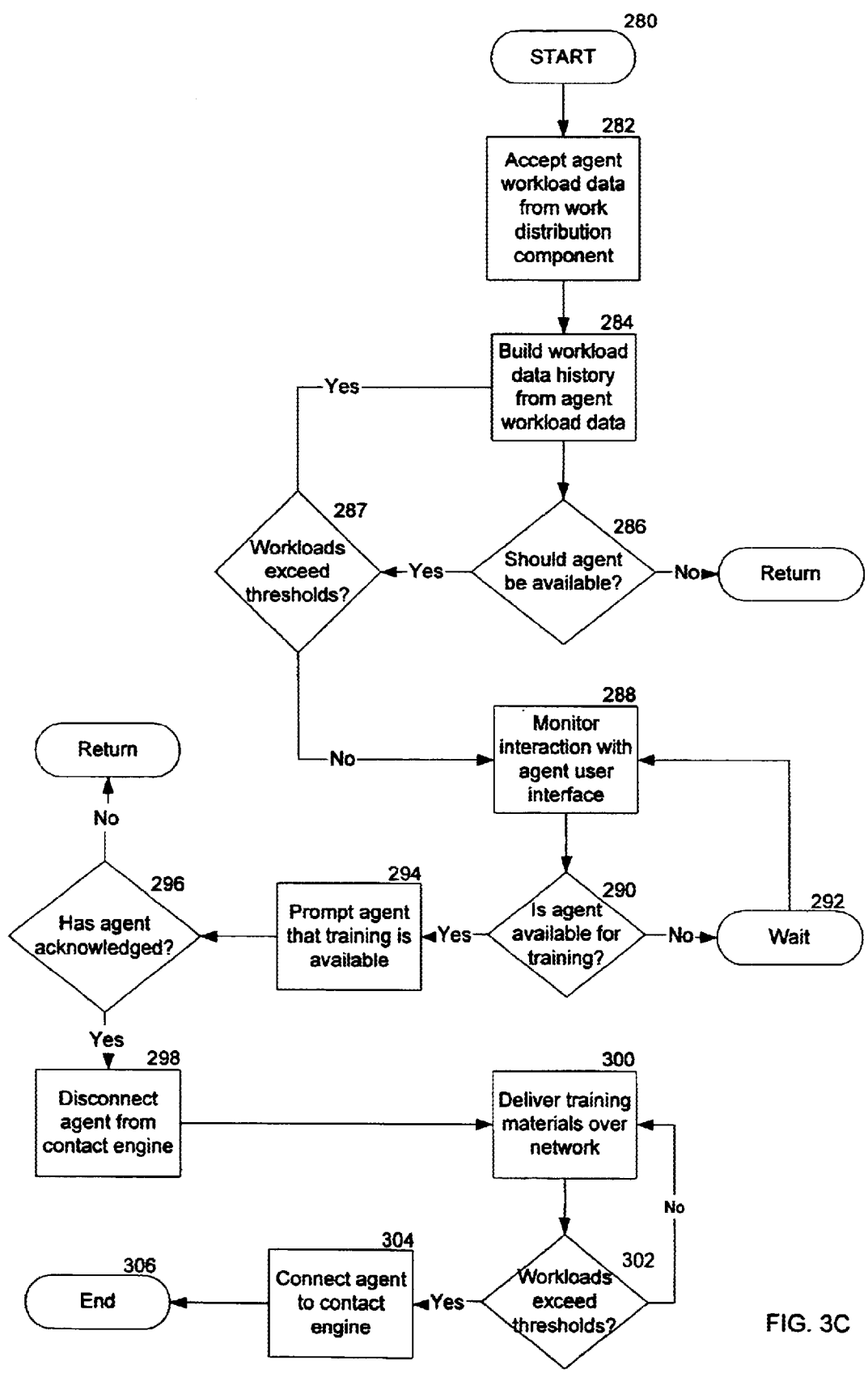

FIG. 3C illustrates the steps in a method according to another advantageous embodiment of the present invention. As shown in FIG. 3C, a method is provided for managing a constituent contact system for a call center based on workload data from a work distribution component, such as an ACD.

Referring now to FIGS. 1, 2 and 3C, the method starts at step 280. At step 282, the information delivery tool 104 of the training system accepts agent workload data from the ACD 32 or other work distribution component. At step 284, the training system 20 builds a workload data history from the agent workload data supplied by the ACD 32. The workload data history may comprise, for example, data indicating the activity for all agents as a whole or for individual agents as a function of recent time. This data is advantageously used by the training system to predict when and if all agents or some agents should be available for training at some point in the future. For example, if the workload data history indicates that call volume drops significantly between 10 p.m. and midnight on Fridays, then the training system can predict that call volume will drop next Friday evening. The training system 20 can thereby determine if an agent should be available for training at some point in the future, such as next Friday evening, based on the workload data history.

If the training system 20 determines at step 286 that the agent should be available at an upcoming time, the method proceeds through the "Yes" branch to step 287. If the system predicts at step 286 that the agent will not be available at the upcoming time, the method proceeds through the "No" branch and returns. At step 287, the training system monitors predetermined agent and call center workload thresholds. If those thresholds are not exceeded, the system proceeds to step 288. If those workload thresholds are exceeded, the system returns to step 284 and updates the workload data history.

At step 288, the training system 20 monitors the interaction of the agent 40 with the agent's user interface 46, such as mouse movements or keystrokes. If the training system 20 determines at step 290 that the agent is not interacting with the agent's user interface 46, then the method proceeds through the "Yes" branch to step 294. If the agent is interacting with the agent's user interface, then the method proceeds through the "No" branch from step 290 to the wait loop at step 292 and again monitors agent user interface activity at step 288. At step 294, the system prompts the agent that training is available. If the agent does not acknowledge the prompt at step 296, the method returns. If the agent acknowledges the prompt at step 296, the system disconnects the agent from the call center contact engine at step 298 and proceeds to step 300.

At step 300, training materials are delivered by the information access tool 106 to the agent 40 over the communications network 54. Workload metrics for the agents in the call center and for the call center as a whole are monitored according to step 302; if the workloads exceed predetermined thresholds, then the method proceeds through the "No" branch back to step 300 and the delivery of training materials continues. If, on the other hand, the workload levels through the training system increase beyond a predetermined threshold or a predetermined length for the training session is exceeded during the delivery of training materials to the agent, then the method proceeds through the "Yes" branch to step 304, and the agent is reconnected to the call center contact engine so that the agent can return to handling customer calls. The method ends at step 306.

It should be emphasized that the illustration of a call center environment in the preceding discussion is an example of one common application that can take advantage of the. present invention, but that the present invention is not limited to call centers or to the delivery of training materials. The methods provided by the present invention can be applied in any constituent contact environment and may include a variety of media through which contact with constituents may be made by the constituent contact system. For example, constituents may include, in addition to customers, the employees of an organization, sales representatives of an organization, suppliers of an organization, contractors of an organization, or other constituents.

Moreover, according to the present invention, the medium of communication between the system and the constituents may include voice contact over the public switched telephone network, e-mail communications provided through the Internet, Internet-based "chat" contact, video communications provided over the Internet or over private broadband networks, or other communications media and forms as are known in the art.

In addition, the method provided by the present invention includes the delivery of a broad range of information to constituent contact agents. In addition to the training materials described above by way of example, any sort of information amenable to distribution via a digital communications network may be delivered in accordance with the present invention. For example, news information, real-time video, sporting event information, music, conference call voice and video information, or other text, audio, video, graphics, or other information may be delivered without departing from the invention.

According to another aspect of the invention, a computer readable medium having computer executable instructions is provided that includes software components adapted to perform steps corresponding to the steps in the methods described above. According to one advantageous embodiment, a scheduling component, a monitoring component and a delivery component are provided. The scheduling component accepts agent schedule data from the training system or the other constituent contact system, including data regarding the assignment of an agent within the organization to perform communications duties via the system. The scheduling component also analyzes the agent schedule data to determine when the agent is scheduled to receive information and to schedule an information delivery session for the agent. The monitoring component monitors the agent's communications with constituents, such as through monitoring a user interface, in order to determine whether or not the agent is available to receive the information. The delivery component is adapted to deliver information to the agent over the communications network at times when the agent is scheduled to receive information as well as available to receive information.

In summary, the present invention can schedule and deliver training or other information to agents in a call center or other constituent contact system. Training materials or other information may be scheduled and delivered to an agent without disrupting the agent's customer contact duties. Agent schedule data from a workforce management component or agent workload data from a work distribution component may be analyzed to decide whether or not an agent is scheduled for training or available for training. The user interface on the agent's terminal may be monitored by the training system 20 to determine whether the agent is busy interacting with constituents. If the agent is not busy, training materials or other information may be delivered to the agent's desktop through the system's communications network. To avoid interference between 'a training session and the agent's customer call duties, the agent may be disconnected from the system's customer contact engine before delivery of the training materials. If the call center's call volume or other metric exceeds a predetermined threshold during the training session, the session may be discontinued so that the agent may return to the agent's customer call duties.

From the foregoing, it will be appreciated that the preferred embodiment of the present invention overcomes the limitations of the prior art described herein. From the description of the preferred embodiment, equivalents of the elements shown therein will suggest themselves to those skilled in the art, and ways of constructing other embodiments of the present invention will suggest themselves to practitioners of the art. Therefore, the scope of the present invention is to be limited only by the claims below.

What is claimed is:

1. In association with a computer system for managing a constituent contact system comprising a communications network, a contact engine, a workforce management component, and an agent user interface, a method for training a contact agent to perform interaction duties, without manual intervention, the method comprising the steps of:

accepting agent schedule data from the workforce management component operable for scheduling and managing the interaction duties of the contact agent;

analyzing the agent schedule data to determine whether the contact agent is scheduled for training;

scheduling a training session so that the contact agent can accept training materials without disrupting the interaction duties of the contact agent; and delivering the training materials during the scheduled training session to the contact agent over the communications network.

2. The method according to claim 1 further comprising the step of monitoring the contact agent's interaction with the agent user interface to determine whether the contact agent is communicating with a constituent and is thus unavailable for training.

3. The method according to claim 1 further comprising the steps of prompting the contact agent during the scheduled training session to provide notice that training material is available; and receiving an acknowledgment from the contact agent indicating that the contact agent is ready to receive the training material.

4. The method according to claim 1 further comprising the step of disconnecting the contact agent from the contact engine before the training material delivery step.

5. The method according to claim 1 wherein the scheduling step further comprises the step of:
accepting agent workload data from a work distribution component of the constituent contact system that routes interaction duties to the contact agent; and
analyzing the agent workload data to determine whether the contact agent is available for training.

6. The method according to claim 5 further comprising the step of monitoring the contact agent's interaction with the agent user interface to determine whether the contact agent is communicating with a constituent and is thus unavailable for training.

7. The method according to claim 5 further comprising the steps of:
prompting the contact agent during the scheduled training session to provide notice that training material is available;
receiving an acknowledgement from the contact agent indicating that the contact agent is ready to receive the training material;
disconnecting the contact agent from the contact engine before the training material delivery step;
terminating the training material delivery step in response to the agent workload data exceeding a predetermined threshold; and
connecting the contact agent to the contact engine after the training material delivery step.

8. The method according to claim 1 wherein the scheduling step comprises the step of accepting agent workload data from a work distribution component of the constituent contact system that routes interaction work to the contact agent, and further comprising the steps of:
building a workload data history from the agent workload data, the workload data history including agent workload data as a function of time;
predicting whether the contact agent is available for training, based on the workload data history and the agent workload data; and
monitoring the contact agent's interaction with the agent user interface to determine whether the contact agent is communicating with a constituent and is thus unavailable for training.

9. The method according to claim 8 further comprising the step of terminating the training material delivery step in response to the agent workload data exceeding a predetermined threshold.

10. A method for managing a call center including a communications network, without manual intervention, the method comprising the steps of:
accepting agent schedule data from a workforce management component of the call center that schedules and manages the customer call duties of the agent;
analyzing the agent schedule data to determine whether the agent is scheduled to receive information;
scheduling an information delivery session so that a call center agent having customer call duties can receive information without disrupting the customer call duties of the agent; and
delivering the information during the scheduled information delivery session to the agent over the communications network.

11. The method according to claim 10 wherein the scheduling step further comprises the steps of:
accepting agent workload data from a call distribution component of the call center that routes customer calls to the agent; and
analyzing the agent workload data to determine whether the agent is available to receive information.

12. The method according to claim 10 wherein the scheduling step comprises the step of accepting agent workload data from a call distribution component of the call center that routes customer calls to the agent.

13. In association with a communications system for managing communications between an organization and its constituents, the system including a communications network, a computer-readable medium having computer-executable instructions comprising:
a scheduling component adapted to:
accept, from the system, agent schedule data including data regarding the assignment of a constituent communications agent within the organization to perform communications duties via the system;
analyze the agent schedule data to determine when the agent is scheduled to receive information; and
schedule an information delivery session for the agent;
a monitoring component adapted to monitor the agent's communications with constituents to determine therefrom whether the agent is available to receive information; and
a delivery component adapted to deliver information to the agent over the communications network when the agent is both scheduled and available to receive information.

14. The computer-readable medium according to claim 13 having further computer-executable instructions comprising an agent communications component adapted to:
prompt the agent during the scheduled information delivery session to provide notice that information is available; and
receive an acknowledgement from the agent indicating that the agent is ready to receive the information.

15. The computer-readable medium according to claim 13 wherein the delivery component is further adapted to discontinue communications between the agent and constituents before delivering the information.

16. The computer-readable medium according to claim 13 wherein the scheduling component is further adapted to:
accept agent workload data from a work distribution component of the system that routes constituent communications assignments to the agent; and
analyze the agent workload data to determine whether the agent is available to receive information.

17. The computer-readable medium according to claim 16 having further computer-executable instructions comprising an agent communications component adapted to:
prompt the agent that information is available; and
receive an acknowledgement from the agent indicating that the agent is ready to receive information;
wherein the delivery component is further adapted to:
discontinue communications between the agent and constituents before delivering the information; and
commence communications between the agent and constituents after delivering the information.

18. In association with a communications system for managing communications between an organization and its constituents, the system including a communications network, a computer-readable medium having computer-executable instructions comprising:

a scheduling component adapted to:
accept agent schedule data from a workforce management component of the system including data regarding the assignment of a constituent communications agent within the organization to perform communications duties via the system;
analyze the agent schedule data to determine when the agent is scheduled to receive information;
accept agent workload data from a work distribution component of the system that routes constituent communications assignments to a constituent communications agent within the organization, wherein the agent performs communications duties via the system; and
analyze the agent workload data to determine whether the agent is available to receive information; and
schedule an information delivery session for the agent;

a monitoring component adapted to monitor the agent's communications with constituents to determine therefrom whether the agent is available to receive information; and a delivery component adapted to deliver information to the agent over the communications network during the information delivery session when the agent is both scheduled and available to receive information.

19. The computer-readable medium according to claim 18 having further computer-executable instructions comprising a workload prediction component adapted to:
build a workload data history from the agent workload data, the workload data history including agent workload data as a function of time; and
predict whether the agent is available to receive information, based on the workload data history and the agent workload data.

20. The computer-readable medium according to claim 18 wherein the delivery component is further adapted to cease delivering information to the agent over the communications network when the agent workload data exceeds a predetermined threshold.

21. The method according to claim 1 further comprising the steps of:
disconnecting the contact agent from the contact engine before delivery of the training material; and
reconnecting the contact agent to the contact engine after completion of the training material.

22. The method according to claim 9 further comprising the step of reconnecting the contact agent to the contact engine after terminating the training material delivery step.

23. The computer-readable medium according to claim 18 wherein the delivery component is further adapted to:
cease delivering information to the agent over the communications network when the agent workload data exceeds a predetermined threshold; and
return the agent to communication with constituents.

24. A method for training a contact agent to perform interaction duties, without manual intervention, the method comprising the steps of:
accepting agent schedule data from a workforce management component of the constituent contact system that schedules and manages the interaction duties of the contact agent;
analyzing the agent schedule data to determine whether the contact agent is scheduled for training;
if not scheduled for training, scheduling a training session so that the contact agent can accept training materials without disrupting the interaction duties of the contact agent; and
delivering the training materials during the scheduled training session to the contact agent.

25. The method according to claim 24 further comprising the step of monitoring the contact agent's interaction with the agent user interface to determine whether the contact agent is communication with a constituent and is thus unavailable for training.

26. The method according to claim 24 further comprising the steps of:
prompting the contact agent during the scheduled training session to provide notice that training material is available; and
receiving an acknowledgment from the contact agent indicating that the contact agent is ready to receive the training material.

27. The method according to claim 24 further comprising the steps of:
disconnecting the contact agent from the contact engine before delivering the training material; and
reconnecting the contact agent to the contact engine after delivering the training material.

28. A method for training a contact agent to perform interaction duties, without manual intervention, the method comprising the steps of:
accepting agent workload data from a work distribution component of the constituent contact system that routes interaction duties to the contact agent;
analyzing the agent workload data to determine whether the contact agent is available for training;
accepting agent schedule data from a workforce management component of the constituent contact system that schedules and manages the interaction duties of the contact agent;
analyzing the agent schedule data to determine whether the contact agent is scheduled for training;
if the contact agent is not scheduled for training and is available, scheduling a training session so that the contact agent can accept training materials without disrupting the interaction duties of the contact agent; and
delivering the training materials during the scheduled training session to the contact agent.

29. The method according to claim 28 further comprising the step of monitoring the contact agent's interaction with the agent user interface to determine whether the contact agent is communicating with a constituent and is thus unavailable for training.

30. The method according to claim 28 further comprising the steps of:
prompting the contact agent during the scheduled training session to provide notice that training material is available; and
receiving an acknowledgment from the contact agent indicating that the contact agent is ready to receive the training material.

31. The method according to claim 28 further comprising the steps of:
disconnecting the contact agent from the contact engine before delivering the training material; and
reconnecting the contact agent to the contact engine after delivering the training material.

32. A method for training a contact agent to perform interaction duties, without manual intervention, the method comprising the steps of:

accepting agent workload data from a work distribution component of the constituent contact system that routes interaction work to the contact agent;

building a workload data history from the agent workload data, the workload data history including agent workload data as a function of time;

predicting whether the contact agent is available for training, based on the workload data history and the agent workload data;

scheduling a training session based on the workload data history and the agent workload data so that the contact agent can accept training materials without disrupting the interaction duties of the contact agent; and delivering the training materials during the scheduled training session to the contact agent.

33. The method according to claim 32, further comprising the step of monitoring the contact agent's interaction with the agent user interface to determine whether the contact agent is communicating with a constituent.

34. The method according to claim 32 further comprising the steps of:

prompting the contact agent during the scheduled training session to provide notice that training material is available; and receiving an acknowledgment from the contact agent indicating that the contact agent is ready to receive the training material.

35. The method according to claim 32 further comprising the steps of:

disconnecting the contact agent from the contact engine before delivering the training material; and reconnecting the contact agent to the contact engine after delivering the training material.

36. In association with a computer system for managing a constituent contact system comprising a communications network, a contact engine, a workforce management component, and an agent user interface, a method for training a contact agent to perform interaction duties, without manual intervention, the method comprising the steps of:

transmitting schedule requests to the workforce management component that schedules and manages the interaction duties of the contact agent;

analyzing agent schedule data and the schedule requests with the workforce management component;

scheduling a training session so that the contact agent can accept training materials without disrupting the interaction duties of the contact agent; and delivering the training materials during the scheduled training session to the contact agent over the communications network.

37. The method according to claim 35 further comprising the step of monitoring the contact agent's interaction with the agent user interface to determine whether the contact agent is communicating with a constituent and is thus unavailable for training.

38. The method according to claim 35 further comprising the steps of:

prompting the contact during the scheduled training session to provide notice that training material is available; and receiving an acknowledgment from the contact agent indicating that the contact agent is ready to receive the training material.

39. The method of claim 36 wherein the scheduling step further comprises the steps of:

accepting contact agent workload data from a work distribution component of the constituent contact system that routes interaction duties to the contact agent; and analyzing the agent workload data to determine whether the contract agent is available for training.

40. A method for training a contact agent to perform interaction duties, without manual intervention, comprising the steps of:

analyzing contact agent schedule data to determine whether to schedule training for the contact agent;

scheduling a training session so that the contact agent can accept training materials without disrupting the interaction duties of the contact agent; and delivering the training materials during the scheduled training sessions to the contact agent over the communications network.

41. The method of claim 40 further comprising the step of receiving a prompt to schedule the training session.

42. The method of claim 40 further comprising the step of monitoring to determine whether the contact agent is free to receive the training materials.

43. The method of claim 40 further comprising the steps of:

prompting the contact agent during the scheduled training session to provide notice that the training material is available; and receiving an acknowledgment from the contact agent indicating that the contact agent is ready to receive the training material.

44. The method of claim 40 wherein the scheduling step further comprises the steps of:

accepting contact agent workload data from a work distribution component of the constituent contact system that routes interaction duties to the contact agent; and analyzing the agent workload data to determine whether the contact agent is available for training.

* * * * *

UNITED STATES PATENT AND TRADEMARK OFFICE
CERTIFICATE OF CORRECTION

| | | |
|---|---|---|
| PATENT NO. | : 6,628,777 B1 | Page 1 of 1 |
| DATED | : September 30, 2003 | |
| INVENTOR(S) | : John C. C. McIlwaine and Matthew G. A. McConnell | |

It is certified that error appears in the above-identified patent and that said Letters Patent is hereby corrected as shown below:

<u>Title page,</u>
Item [75], Inventors, should read as follows:
-- [75] Inventors: John C. C. McIlwaine, Alpharetta, GA (US); Matthew G. A. McConnell, Duluth, GA (US) --

Signed and Sealed this

Thirtieth Day of December, 2003

JAMES E. ROGAN
*Director of the United States Patent and Trademark Office*